March 7, 1939.  J. A. WHITE  2,150,088
FISHING REEL
Filed July 7, 1937
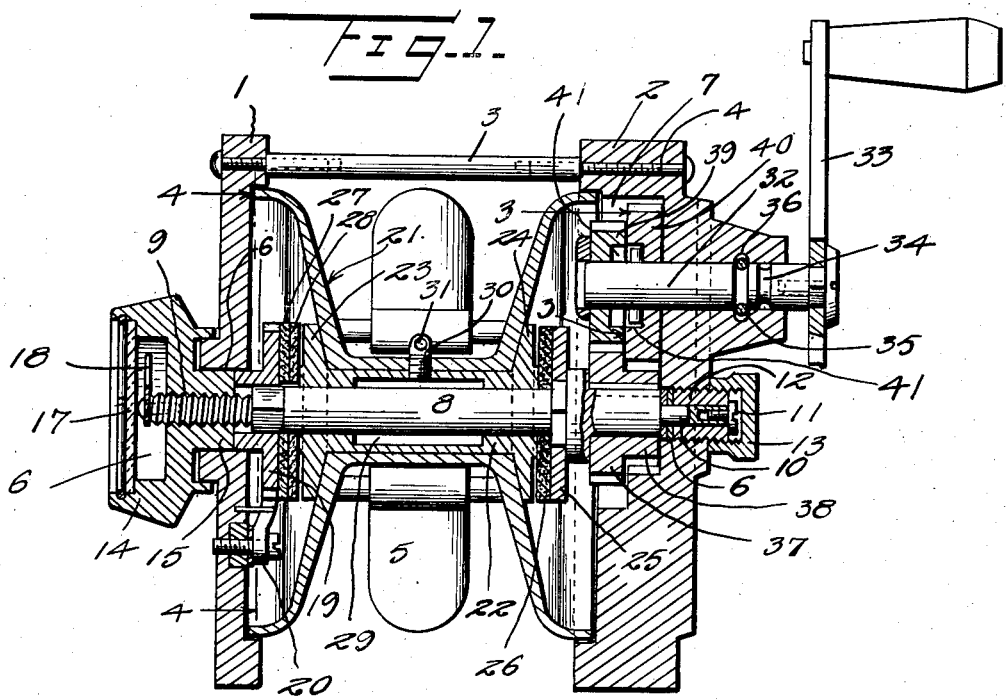
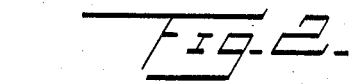
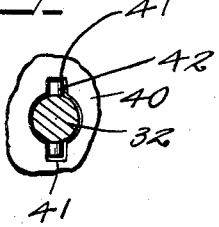
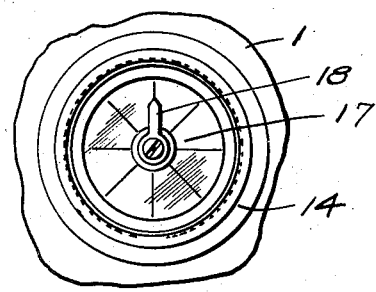
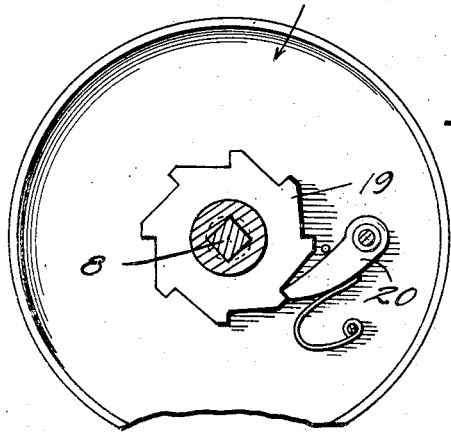
J. A. White
INVENTOR
BY Victor J. Evans & Co.
ATTORNEYS Patented Mar. 7, 1939

2,150,088

UNITED STATES PATENT OFFICE 2,150,088

FISHING REEL

John A. White, Harlingen, Tex.

Application July 7, 1937, Serial No. 152,445

2 Claims. (Cl. 242—84.5)

This invention relates to fishing reels and has for the primary object the provision of a device of this character which will permit the line reel thereof to be rotated at different speeds relative to the speed of rotation of the handle and which is so constructed that the change of speed of the line reel may be easily and quickly accomplished by the operator.

Another object of this invention is the provision of an adjustable friction clutch for connecting the line reel and the shaft thereof, whereby the slippage of the line reel relative to said shaft may be increased and decreased in accordance with the resistance or pull made by the fish caught on the line of said reel, thus decreasing and increasing the drag on the line for the purpose of tiring the fish and which will permit the line reel to be freed of said shaft when desiring to cast the line.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a fishing reel constructed in accordance with my invention.

Figure 2 is a fragmentary end view illustrating the indicator and means for varying the action of the friction clutch.

Figure 3 is a detail sectional view taken on the line 3—3 of Figure 1.

Figure 4 is a sectional view taken on the line 4—4 of Figure 1.

Referring in detail to the drawing, the numerals 1 and 2 indicate end plates which are detachably connected in spaced relation by tie rods 3 in which are threaded bolts 4 after passing through said end plates. Certain of the tie rods have formed thereon a mounting plate 5 of a conventional construction and used for cooperation with reel clamps on a fishing pole (not shown), to removably secure the reel on the pole. The end plates 1 and 2 have aligned openings 6 and the end plate 2 has formed in one face a gear chamber 7. A reel shaft 8 extends through the openings of the end plates and one end is screw threaded, as shown at 9, and the other end reduced to form a spindle 10 provided with a screw threaded socket to receive a set bolt 11 employed for securing on the spindle a sleeve bearing 12 which is threaded in the opening of the plate 2 and also has threaded thereon a cap 13 overlying the bolt 11 and acting as a means of limiting endwise movement of the shaft. A finger piece 14 is threaded on the screw threaded end 9 of the shaft 8 and engages with the end plate 1. The finger piece includes a hub portion 15 received in the opening 6 of the end plate 1 and also an indicator chamber 16 closed by a removable transparent panel 17. A suitable scale is applied to the inner wall of the scale or indicator chamber, as shown in Figure 2, and cooperating therewith is an indicator 18 detachably secured to the screw threaded end 9 of the shaft 8. The opening 6 of the end plate 1 also receives therein the hub portion of a ratchet gear 19 and the latter is secured on the shaft 8. A spring pressed dog 20 is carried by the end plate 1 and cooperates with the ratchet gear 19 in limiting the rotation of the shaft 8 in one direction and in a direction reverse to that for the winding of a fishing line on a line reel 21 carried by the shaft 8. The flanges of the line reel 21 are curved outwardly so as to permit a line to readily feed on and off of the reel. In the hub of the line reel is a bearing sleeve 22 journaled on the shaft 8 and has end flanges 23 and 24 acting as clutch elements of friction clutches employed between the line reel and the shaft 8. Secured on the shaft 8 is a clutch plate 25 and interposed between the latter and the flange 24 is a friction disc 26. A friction disc 27 is secured on the ratchet gear 19 and cooperating therewith is a friction disc 28 engageable with the flange 23 of the bearing sleeve 22. A portion of the bearing sleeve is spaced from the shaft 8 to form a lubricant reservoir 29 capable of being filled with lubricant after the removal of a plug 30. The plug is threaded in aligned openings of the line reel and the bearing sleeve and has an apertured end 31 to which one end of a fishing line may be secured. The hub 15 of the finger piece 14 bears against the hub of the ratchet gear 19 and by rotating the finger piece in opposite directions the action of the friction clutches between the shaft 8 and the line reel may be varied, that is, the slippage may be increased and decreased. By adjusting the finger piece 14 in one direction to the limit of its adjustment the friction clutches may be caused to grip to such an extent that a positive drive will be had between the shaft 8 and the line reel and on a rotation of the finger piece in an opposite direction the clutches may be caused to slip to such an extent that the reel may rotate freely on the shaft 8 which is desirable when casting a line from the line reel.

A gear shaft 32 is journaled in the end plate 2 and has secured to one end a handle 33 for the manual rotation of said gear shaft. Spaced grooves 34 are formed in the gear shaft and a split ring 35 mounted in a groove 36 of the end plate 2 may ride into and out of said grooves 34 for the purpose of permitting the gear shaft to be adjusted endwise to assume different positions and to be free to rotate in either of its positions. Gears 37 and 38 are secured on the shaft 8 within the chamber 7 of the end plate 2 and are of different ratios. Gears 39 and 40 are journaled on the gear shaft 32 within the chamber 7 of the end plate 2 and are of different ratios to match the ratios of the gears 37 and 38. The gear 39 meshes with the gear 37 and the gear 40 meshes with the gear 38. The gears 37 and 38 may be integrally connected. The gears 39 and 40 in their opposed faces are provided with notches 41 and secured on the gear shaft 32 is a pin 42 adapted to enter the notches of the gear 39 or the gear 40 in accordance with the position assumed by the gear shaft 32. Through this arrangement of gears, the shaft 8 may be rotated at different ratios of speed by the rotation of the shaft 32, the latter being rotated at a selected speed by the operator turning the handle 33. The gears shown in the drawing are of ratios which will permit the shaft 8 to be rotated approximately the same rate of speed as the gear 32 or at an increased rate of speed. The operator by pulling on the handle 33 can easily shift the gear shaft into either of its positions for connecting and disconnecting the gears 39 and 40 to said gear shaft.

When the reel is employed for winding in a fish, the line reel is rotated through the rotation of the handle 33 and if it is desired to permit the line reel to rotate for playing out line when a severe pull is made on the line by the fish, the finger piece 14 is adjusted or turned in the proper direction to permit the friction clutches to have slippage and whenever it is desired to discontinue the slippage or to provide a positive connection between the shaft 8 and the line reel, the finger piece 14 is adjusted to bring about a desired positive friction drive of the clutch elements so that if the fish is making a run with the line it can be at any time checked and held by the ratchet gear and the dog 20 after the proper adjustment of the finger piece 14 to bring about the positive driver between the shaft 8 and the reel. The ratchet gear and dog 20 will permit winding of the line reel any time to wind the line thereon.

What is claimed is:

1. A fishing reel comprising end plates having aligned shaft openings, connecting means joining said end plates, a reel shaft loosely received in said shaft openings, means journaling said shaft in one of the openings, a finger piece including a hub threaded on said shaft and acting as a journal for the latter in the other shaft opening, clutch plates fixed for rotation with the shaft and one abutted by the hub of the finger piece and slidable relative to said shaft and including a ratchet gear and the other of said clutch plates being fixed against endwise movement on the shaft a sleeve journaled on the shaft and including clutch plates to coact with the first-named clutch plates in establishing a releasable friction drive between said shaft and sleeve controlled by the adjustment of the finger piece on the shaft, a reel line secured on said sleeve, a hand operated means for rotating the shaft, and a spring dog pivoted on one of the end plates and engaging the ratchet gear of one of said clutch plates.

2. A fishing reel comprising end plates having aligned shaft openings, connecting means joining said end plates, a reel shaft loosely received in said shaft openings, means journaling said shaft in one of the openings, a finger piece including a hub threaded on said shaft and acting as a journal for the latter in the other shaft opening, clutch plates fixed for rotation with the shaft and one abutted by the hub of the finger piece and slidable relative to said shaft and including a ratchet gear and the other of said clutch plates being fixed against endwise movement on the shaft, a sleeve journaled on the shaft and including clutch plates to coact with the first-named clutch plates in establishing a releasable friction drive between said shaft and sleeve controlled by the adjustment of the finger piece on the shaft, a line reel mounted on said sleeve, hand operating means for rotating the shaft, a spring dog pivoted on one of the end plates and engaging the ratchet gear, said sleeve having a lubricant chamber with the shaft extending therethrough, and a pin detachably connecting the line reel and sleeve and removable to permit lubricant to be placed in the chamber and having an eye for connecting one end of a line on said line reel.

JOHN A. WHITE.